(12) United States Patent
Ravindranath et al.

(10) Patent No.: US 12,200,168 B2
(45) Date of Patent: Jan. 14, 2025

(54) SUPPORTING CAPTIONS FOR DEVICES WITHOUT NATIVE CAPTIONS CAPABILITY

(71) Applicant: Cisco Technology, Inc., San Jose, CA (US)

(72) Inventors: Ram Mohan Ravindranath, Karnataka (IN); Faisal Siyavudeen, Kerala (IN); Manish Joshi, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 392 days.

(21) Appl. No.: 17/682,584

(22) Filed: Feb. 28, 2022

(65) Prior Publication Data

US 2023/0275994 A1    Aug. 31, 2023

(51) Int. Cl.
*H04M 3/42*    (2006.01)

(52) U.S. Cl.
CPC ... *H04M 3/42391* (2013.01); *H04M 3/42263* (2013.01); *H04M 2201/38* (2013.01)

(58) Field of Classification Search
CPC ......... H04M 3/42391; H04M 2201/38; H04M 3/42263
See application file for complete search history.

(56) References Cited

U.S. PATENT DOCUMENTS

| | | | |
|---|---|---|---|
| 6,816,468 B1 | 11/2004 | Cruickshank | |
| 9,967,380 B2* | 5/2018 | Engelke | H04M 3/42382 |
| 11,190,630 B1* | 11/2021 | Engelke | H04M 3/42391 |
| 11,392,758 B2* | 7/2022 | Joshi | G06F 40/143 |
| 11,856,123 B1* | 12/2023 | Engelke | H04M 1/72412 |
| 11,895,257 B1* | 2/2024 | Engelke | H04M 3/42391 |
| 2008/0064326 A1* | 3/2008 | Foster | H04N 21/4394 455/3.06 |
| 2015/0341486 A1 | 11/2015 | Knighton | |
| 2018/0034960 A1* | 2/2018 | Chevrier | H04M 1/2475 |
| 2019/0028772 A1* | 1/2019 | Perez | H04N 21/4884 |
| 2019/0394329 A1 | 12/2019 | Engelke et al. | |
| 2020/0288013 A1 | 9/2020 | Pan | |
| 2020/0366789 A1 | 11/2020 | Patron et al. | |
| 2021/0067629 A1 | 3/2021 | Engelke et al. | |
| 2022/0150352 A1* | 5/2022 | Engelke | H04M 1/2475 |
| 2022/0417608 A1* | 12/2022 | Zhuang | H04N 21/42204 |
| 2024/0073311 A1* | 2/2024 | Engelke | H04M 3/42153 |

(Continued)

OTHER PUBLICATIONS

CaptionCall, "The CaptionCall Phone" https://captioncall.com/products, retrieved Feb. 28, 2022, 8 pages.

(Continued)

*Primary Examiner* — Lisa Hashem
(74) *Attorney, Agent, or Firm* — Edell, Shapiro & Finnan, LLC

(57) ABSTRACT

A call is conducted with a first device of a user, the first device lacking captions capability. A second device of the user is identified for receiving captions for the call from among a plurality of second devices of the user based on one or more from a group of distances of the second devices to a location of the first device, display quality of the second devices, status of the second devices, and user preferences for the second devices. An identified second device is joined to the call to receive the captions during the call conducted with the first device.

20 Claims, 7 Drawing Sheets

(56) References Cited

U.S. PATENT DOCUMENTS

2024/0127822 A1* 4/2024 Engelke .................. G10L 15/01
2024/0127823 A1* 4/2024 Engelke .............. H04M 1/2475

OTHER PUBLICATIONS

CaptionCall, "How does the CaptionCall captioned telephone work?," https://www.youtube.com/watch?v=gzZ67hmS3BA, Dec. 23, 2015, 1 page.
Floyd, "How CaptionCall Makes Telephone Captions Easy," CaptionCall Blog, https://captioncall.com/hearing-technology/how-captioncall-makes-telephone-captions-easy, Sep. 2021, 10 pages.
CaptionCall, "How CaptionCall Works," https://captioncall.com/products/how-it-works, Sep. 2021, 6 pages.
CapTel, "What is CapTel Captioned Telephone," https://www.captel.com/captel/#howitworks, Jul. 2020, 7 pages.
Healthy Hearing, "Captioned Phones and Apps," https://www.healthyhearing.com/help/assistive-listening-devices/captioned-phones, Jan. 28, 2022, 4 pages.
TDI, "TDI World—vol. 47 Issue 4," https://tdiforaccess.org/wp-content/uploads/2020/01/Vol.-47-Issue-4-2016-uCaption.pdf, Jan. 2020, 28 pages.
ClearCaptions, "ClearCaptions Home Phone," https://clearcaptions.com/home-phone/, Feb. 2022, 6 pages.

* cited by examiner

US 12,200,168 B2

SUPPORTING CAPTIONS FOR DEVICES WITHOUT NATIVE CAPTIONS CAPABILITY

TECHNICAL FIELD

The present disclosure relates to enabling captions for voice or other communications over networks.

BACKGROUND

While using a Public Switched Telephone Network (PSTN) for a call (e.g., incoming or outgoing), a closed caption feature is not available for a device used for the call lacking captions capability. For example, since captions may not be supported by desk phones, captions are not available when using these devices for the call. In addition, when a participant joins a meeting via a PSTN device lacking captions capability (e.g., by direct dial-in from, or a callback to, the PSTN device lacking captions capability), the PSTN device used by the participant cannot receive captions for the meeting.

DESCRIPTION OF EXAMPLE EMBODIMENTS

Overview

Figure 1:
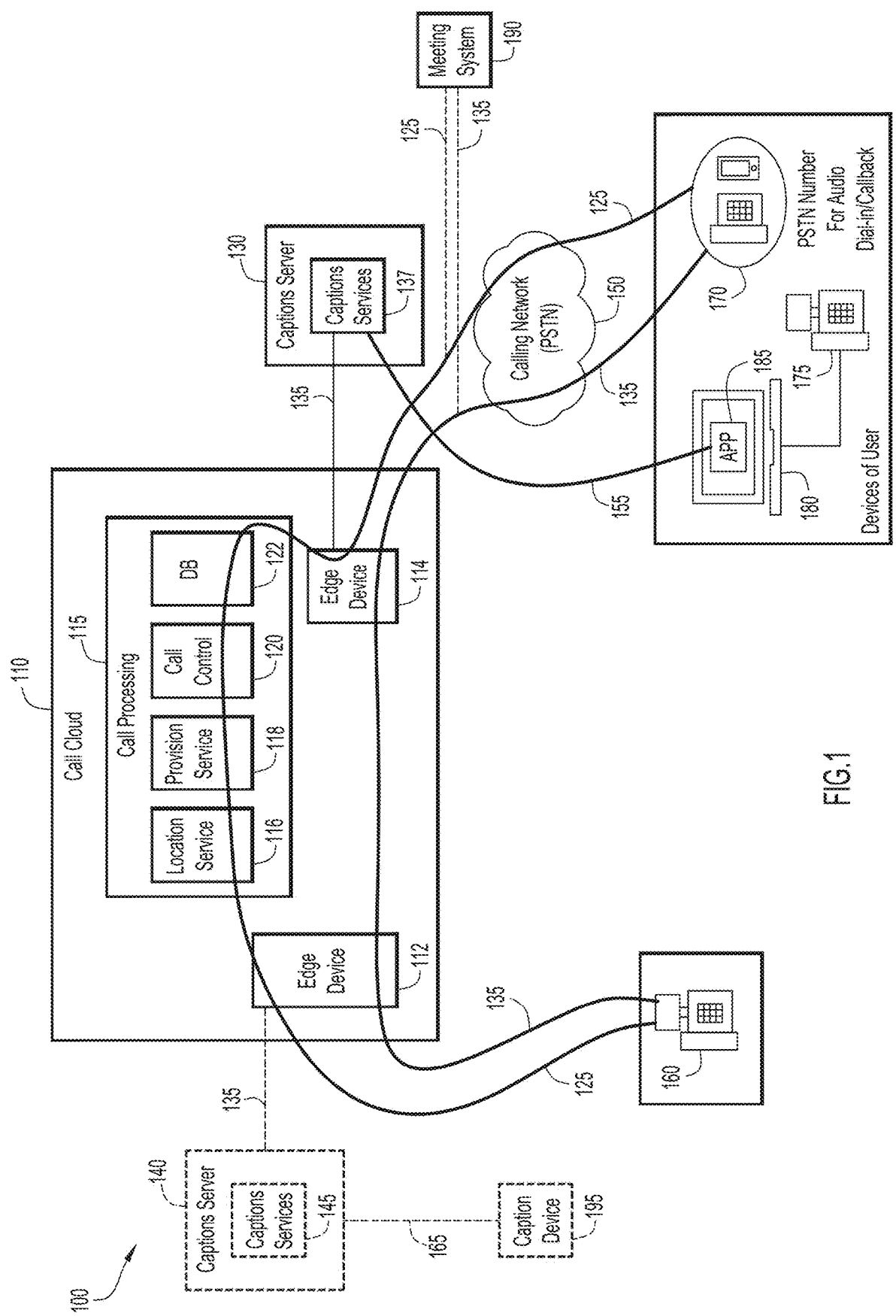
FIG. 1 illustrates a block diagram of a system configured for enabling captions for a device without captions capability, according to an example embodiment.

In one example embodiment, a call is conducted with a first device of a user, the first device lacking captions capability. A second device of the user is identified for receiving captions for the call from among a plurality of second devices of the user based on one or more from a group of distances of the second devices to a location of the first device, display quality of the second devices, status of the second devices, and user preferences for the second devices. An identified second device is joined to the call to receive the captions during the call conducted with the first device.

EXAMPLE EMBODIMENTS

An example embodiment enables captions to be available for a device lacking captions capability that is used for conducting a Public Switched Telephone Network (PSTN) or other network call (e.g., PSTN, Voice over Internet Protocol (VoIP) (which may utilize PSTN for calls), etc.). The call may include any type of media (e.g., video, audio, etc.). For example, the call may include a PSTN or other network call between parties (e.g., a call between two parties, a conference call between three or more parties, etc.), or a PSTN or other network call to participate in a meeting (e.g., by direct dial-in or call back to a PSTN device, etc.). The captions may include a textual representation of any audio portions of a call (e.g., a text transcription of audio of a call, a text transcription of audio of any individual call participant, a textual transcription of audio of any quantity of call participants, etc.), and may be rendered via any caption device associated with a user that is able to provide the captions. By way of example, the caption device may include an application on a same device used for a call or on a device with a different PSTN number or other network identifier than the device used for the call (e.g., a soft client providing calling functions from a computing device, a meeting application on a computing device, a client application on a computing device, etc.), a mobile phone, an application on a computing device controlling a desk phone or other device (e.g., via desk phone control (DPC) mode, etc.), and/or any other device (e.g., application and/or computing device, etc.) that is able to provide captions.

The caption device presents the captions while another user device is used for the call. The caption device is associated with a user based on a user identifier (e.g., Public Switched Telephone Network (PSTN) number or other identifier, etc.), and may have a different network identifier than the device used for the call (e.g., a different PSTN number or other network identifier, a Session Initiation Protocol (SIP) Uniform Resource Identifier (URI) that is not associated with the PSTN number or other identifier, etc.). For example, the caption device may be another device associated with a user, but with a different network identifier than the device used for the call (e.g., a soft client that has a different PSTN number or network identifier and provides calling functions from a computing device, a meeting application on a computing device, a client application on a computing device, a device with a Session Initiation Protocol (SIP) Uniform Resource Identifier (URI) that is not associated with the PSTN number or other identifier, etc.).

FIG. 1 illustrates a block diagram of an example system 100 configured to enable captions for a device without captions capability according to an example embodiment. System 100 includes a call cloud 110, a captions server 130, and a calling network 150. Call cloud 110 includes edge devices 112, 114 and one or more server systems 115, preferably implemented in a cloud computing environment. Server systems 115 provide various call processing services to conduct a call and provide captions to a caption device. Calling network 150 may be implemented by any conventional or other network for establishing and conducting calls (e.g., Public Switched Telephone Network (PSTN), etc.).

Edge devices 112, 114 control data flow between networks and serve as entry/exit locations for networks. For example, edge device 112 serves as an entry/exit point for data transference between call cloud 110 and device 160 of a user, while edge device 114 serves as an entry/exit point for data transference between call cloud 110 and captions server 130 and between call cloud 110 and calling network 150. Edge devices 112, 114 may perform various conventional or other network functions including transmitting data, routing, monitoring, filtering, translating between network protocols, and/or storing data transferred between networks. In addition, edge devices 112, 114 may mix various call/media streams to consolidate the streams (e.g., produce a single stream containing information from those streams, etc.). For example, a call between two parties, a conference call, or a meeting may include plural participants. Edge devices 112, 114 may mix various data streams of the participants to produce a reduced amount of streams or a single stream for processing (e.g., caption generation, etc.).

Signaling information 125 and media information 135 for a call are transferred between edge device 112 and a device 160 of a user (e.g., via Voice over Internet Protocol (VoIP), Public Switched Telephone Network (PSTN), etc.). By way of example, device 160 includes a conventional or other desk phone, but any suitable calling device may be utilized. Signaling information 125 and media information 135 for a call are also transferred between edge device 114 and a device 170 of a user via calling network 150. Device 170 may include any conventional or other calling devices (e.g., a Public Switched Telephone Network (PSTN) handset, a mobile phone (with PSTN functionality lacking captions capability), etc.). Signaling information 125 may include any information for establishing and processing a call (e.g., Public Switched Telephone Network (PSTN) numbers or network identifiers of parties to the call, calling user information, device information and control, control/routing information, etc.). Media information 135 may include information pertaining to content of the call (e.g., audio, video, metadata, etc.).

Signaling information 125 is provided from edge devices 112, 114 to server systems 115 of call cloud 110 that process the signaling information for the call, and include location service 116, provision service 118, call control 120, and database 122. Call control 120 basically serves as a call controller to control processing of a call. Call control 120 registers devices of users, and performs call routing. The devices are associated with a user based on a user identifier (e.g., PSTN number or network identifier, participant identifier, etc.), where the associations are stored in database 122. The call control is associated with one or more users, where calling cloud 110 may include a plurality of instances of call control 120 each handling a different group of users. Location service 116 locates a receiving user (or device) for a call which is provided to call control 120 for routing. Provision service 118 provisions the devices of a user, while database 122 maintains data for these services processing the call (e.g., device registrations, location information, user groups handled by different call control instances, etc.).

The various call processing services may process a call in any conventional or other manner and according to any conventional or other protocol (e.g., Session Initiation Protocol (SIP), etc.). For example, server systems 115 may receive signaling information 125 for a call to a receiving user from edge device 112 (e.g., initiated by the user of device 160) or from edge device 114 (e.g., initiated by the user of device 170). Call control 120 associated with the calling user interacts with location service 116 to identify a call control 120 associated with the receiving user. The call control associated with the calling user sends a request to the call control associated with the receiving user to establish the call. The call control associated with the receiving user identifies devices associated with the receiving user, and routes the call (including signaling information 125) to one or more of those devices (e.g., through edge devices 112, 114, calling network 150, etc.). The receiving user may answer the call on any of the devices associated with the receiving user that are receiving the call. Signaling information 125 and media information 135 (or content) for the call are transferred between the device initiating the call and the device answering the call through call cloud 110, edge devices 112, 114, and/or calling network 150 in order to conduct the call.

In addition, call control 120 may determine a caption device associated with a user of a call employing a device lacking captions capability, and direct that captions be provided to that device on a separate channel 155 (e.g., web socket or http connection, etc.) relative to the channels used for the call (e.g., channels through call cloud 110, edge devices 112, 114, calling network 150, etc.) according to an example embodiment as described below.

Media information 135 is transferred between edge device 112 and edge device 114. Edge device 112 transfers the media information with device 160, while edge device 114 transfers the media information with device 170 via calling network 150. In one embodiment, edge device 114 further provides media information 135 of the call (e.g., over a network (e.g., Internet, WAN, etc.)) to captions server 130 (e.g., forks (or splits) media information 135 on a separate path to captions server 130). The captions server may be disposed within or external of call cloud 110, and includes captions services 137 that convert audio of the call to text to generate captions for presentation on a caption device associated with a user employing a device for the call lacking captions capability. The media information and captions may be associated with timestamps or other indicators to enable the captions to be synchronized with audio of the call. The captions may be generated by any conventional or other techniques. For example, the captions may be generated manually by users transcribing audio of the call. Alternatively, or in addition, the captions may be generated automatically by any conventional or other speech-to-text mechanisms (e.g., speech-to-text applications, etc.).

The captions are provided to a caption device associated with a user on separate channel 155. Call control 120 identifies a caption device of a user employing a device for the call lacking captions capability, and directs the captions to be provided to the identified caption device over separate channel 155. Channel 155 is preferably a low latency channel, but may be implemented by any suitable channel separate from channels used for the call (e.g., a web socket or http connection from captions server 130 to the identified caption device associated with the user, etc.).

By way of example, a user of device 160 initiates a call to a user of device 170 lacking captions capability. Device 160 may include a desk phone, while device 170 may include any conventional or other calling devices (e.g., a Public Switched Telephone Network (PSTN) handset, a mobile phone (with PSTN functionality lacking captions capability), etc.). The user of device 170 desires captions for the call, and has registered various devices including a caption device to render captions for calls conducted by device 170. For example, a desk phone 175 may also be associated with the user of device 170, and be controlled by an application 185 on a computing device 180 (e.g., via desk phone control (DPC) mode, etc.). Application 185 is capable of rendering captions, and is registered as a caption device of the user of device 170 with a corresponding call control 120.

Signaling information 125 of the call is provided from device 160 to edge device 112 that transfers the signaling information to call cloud 110 for processing by server systems 115 to route the call. The signaling information is provided from server systems 115 to edge device 114 that transfers the signaling information to calling network 150 to route the call to device 170. Media information 135 is transferred between edge device 112 and device 160, and between edge devices 112, 114. The media information is also transferred between edge device 114 and device 170 through calling network 150. Edge device 114 may mix various media streams of the call (to consolidate the streams), and forks (or splits) the media information for the call on a separate path to captions server 130. The separate path preferably operates in parallel with respect to paths for the call (e.g., through call cloud 110, edge devices 112, 114, calling network 150, etc.). Signaling information 125 and media information 135 (or content) for the call are transferred between device 160 and device 170 through call cloud 110, edge devices 112, 114, and/or calling network 150 in order to conduct the call as described above.

The audio of the media information for the call from edge device 114 is processed by captions services 137 of captions server 130 during the call to convert the audio to text and generate captions. Call control 120 identifies the caption device (e.g., application 185 on computing device 180) for the user of device 170, and directs captions to be sent to the caption device. The captions are provided by separate channel 155 to the caption device (e.g., application 185 on computing device 180) for presentation by the caption device to the user of device 170. The captions and media information may include timestamps or other indicators to present the captions in synchronization with audio of the call. Thus, the user of device 170 may receive captions for a call conducted by a device without captions capability.

In an embodiment, telephones/soft or other client applications that provide call functions and/or control a desk phone (e.g., conduct a call through the desk phone via desk phone control (DPC) or other mode, etc.) may serve as a caption device. In this case, calls conducted by users from a desk phone (e.g., or from a client application through the desk phone) that does not support captions may receive captions in the client application used to control the desk phone. For example, the call initiated by the user of device 160 described above may alternatively be directed to desk phone 175 lacking captions capability, where the captions for the call are presented by application 185 on computing device 180 in substantially the same manner described above.

In an embodiment, device 160 may lack captions capability and the user of that device may also desire captions for the call. The captions may be provided to the user of device 160 on an associated caption device 195 in substantially the same manner described above. For example, edge device 112 may fork (or split) media information for the call on a separate path to corresponding captions services 145 of a captions server 140 (substantially similar to captions services 137). Captions server 140 may be within or external of call cloud 110. The audio of the media information is processed by corresponding captions services 145 during the call to convert the audio to text and generate captions. The captions are provided by a separate channel 165 (substantially similar to channel 155) to caption device 195 associated with the user of device 160 for presentation by caption device 195 to the user of device 160 in substantially the same manner described above. The captions and media information may include timestamps or other indicators to present the captions in synchronization with audio of the call.

In an embodiment, system 100 may further include a meeting system 190 that conducts meetings or conferences. The meeting system may be implemented by any conventional or other meeting system, and includes one or more server systems to conduct the meetings or conferences. A user may join a meeting of meeting system 190 and utilize a calling device lacking captions capability (e.g., device 160) to conduct a Public Switched Telephone (PSTN) or other network call for providing and/or receiving audio for the meeting. The user may dial-in to, or receive a call back from, the meeting system on the calling device to provide and/or receive audio for the meeting. The meeting system may be coupled to edge device 114 (e.g., to exchange signaling information 125 and media information 135), where the call (to or from meeting system 190) is processed by call cloud 110 in substantially the same manner described above. In this case, the captions may be provided on a caption device 195 associated with the user. For example, when the user has a meeting application installed on a PSTN or other device and uses a PSTN dial-in/call back number, the meeting application on the device may be used as a caption device for the call.

By way of example, edge device 112 may receive media information 135 of a meeting of meeting system 190 from edge device 114, and fork (or split) the media information on a separate path to corresponding captions services 145 of captions server 140 (substantially similar to captions services 137). The audio of the media information is processed by corresponding captions services 145 during the call to convert the audio to text and generate captions. The captions are provided by a separate channel 165 (substantially similar to channel 155) to caption device 195 associated with the user of device 160 (e.g., a desk phone) for presentation by caption device 195 to the user of device 160 in substantially the same manner described above. The captions and media information may include timestamps or other indicators to present the captions in synchronization with audio of the meeting.

Alternatively, device 170 may initiate a call to device 160, or initiate or receive a call from meeting system 190, and receive captions for the call on a caption device in substantially the same manner described above. In this case, signaling information 125 for the call is provided to call cloud 110 through edge device 114. Call cloud 110 processes the call to establish and conduct the call (e.g., between device 170 and device 160, between device 170 and meeting system 190, etc.) through edge devices 112, 114 and/or calling network 150 in substantially the same manner described above. Edge device 114 forks (or splits) the media information for the call on a separate path to captions server 130 in order to provide captions to the caption device (e.g., application 185 on computing device 180) in substantially the same manner described above. Also, edge device 112 may fork (or split) the media information for the call with device 170 on a separate path to captions server 140 in order to provide captions to caption device 195 for presentation to a user of device 160 in substantially the same manner described above.

Figure 2:
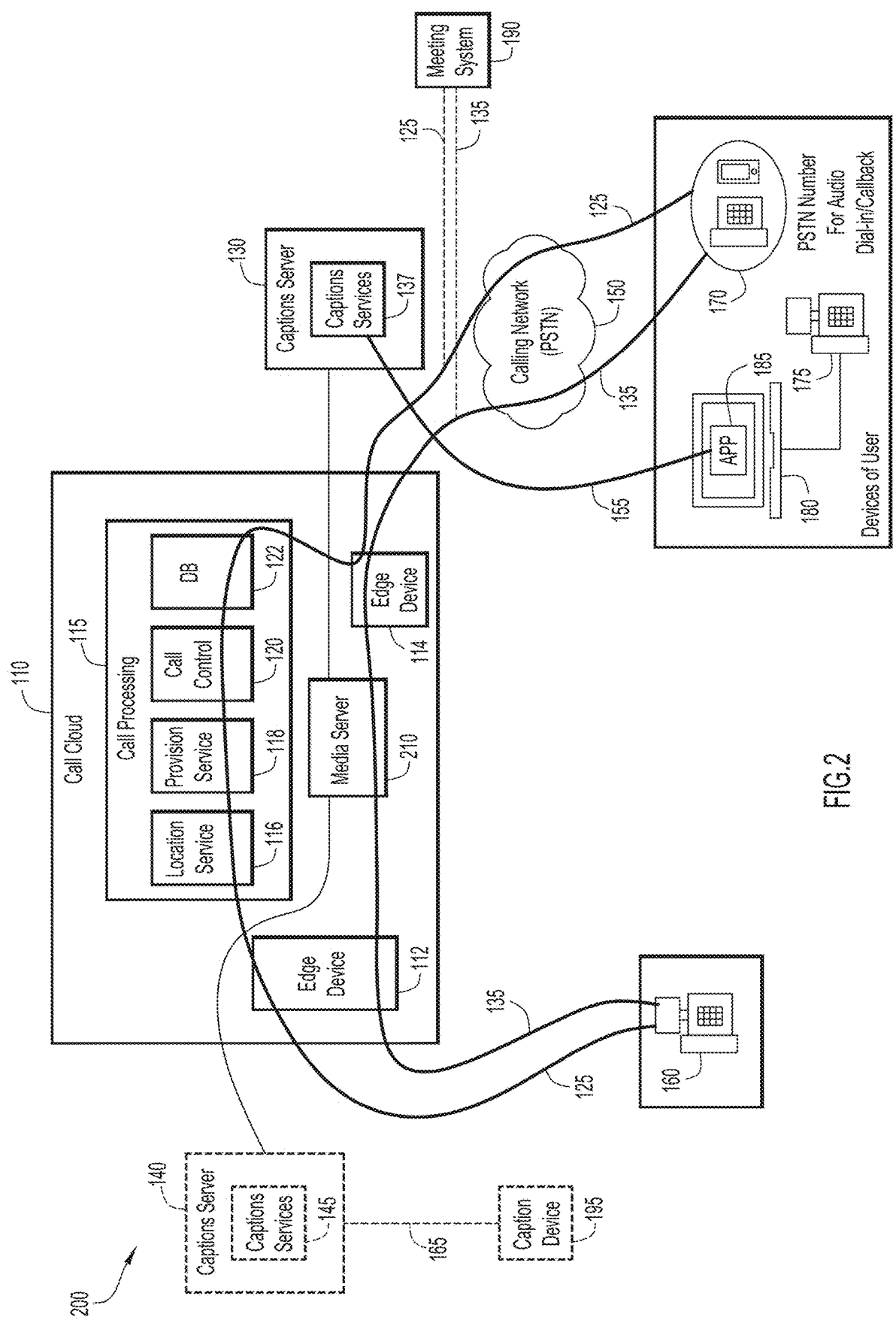
FIG. 2 illustrates a block diagram of another system configured for enabling captions for a device without captions capability, according to an example embodiment.

FIG. 2 illustrates a block diagram of another example system 200 configured to enable captions for a device without captions capability according to an example embodiment. System 200 is substantially similar to system 100 described above, except that call cloud 110 includes a media server 210 coupled to edge devices 112, 114 that receives media information for the call. The media server mixes and forks (or splits) the media information for the call for captions generation. The media server may perform various conventional or other functions including mixing, storing, and distributing media over a network.

Initially, a user of device 160 initiates a call to device 170 as described above for FIG. 1. Signaling information 125 from device 160 is processed by call cloud 110, edge devices 112, 114, and calling network 150 in substantially the same manner described above for FIG. 1 for establishing and conducting the call. Media information 135 is transferred between edge device 112 and device 160 as described above for FIG. 1, and between media server 210 and edge devices 112, 114. Media information 135 is further transferred between edge device 114 and device 170 through calling network 150 as described above for FIG. 1. The media server may mix various media streams (e.g., of call participants, etc.) of the media information for the call to consolidate or reduce the amount of the streams for processing (e.g., produce a single stream of call participants for processing, etc.). Further, the media server forks (or splits) the media information for the call on a separate path to captions services 137 of captions server 130 (e.g., over a network (e.g., Internet, WAN, etc.)) during the call to generate captions of audio of the call. The captions are provided by separate channel 155 to a caption device (e.g., application 185 on computing device 180) for presentation to the user of device 170.

Alternatively, device 170 may initiate a call to device 160, or initiate or receive a call from meeting system 190, as described above for FIG. 1. Signaling information 125 for the call is processed by call cloud 110, edge devices 112, 114, and/or calling network 150 in substantially the same manner described above for FIG. 1 for establishing and conducting the call (e.g., between device 170 and device 160, between device 170 and meeting system 190). Media server 210 may mix the media information for the call, and forks (or splits) the media information for the call on a separate path to captions services 137 of captions server 130 (e.g., over a network (e.g., Internet, WAN, etc.)) in order to provide captions to the caption device (e.g., application 185 on computing device 180) in substantially the same manner described above.

In an embodiment, the media server may similarly be used to mix and fork (or split) media information for the call for captions generation for a user of device 160 in substantially the same manner described above. In this case, media server 210 may receive media information 135 from edge devices 112, 114 for a call (e.g., between device 160 and device 170, between device 160 and meeting system 190, etc.) as described above. The media server may mix various media streams of the media information for the call (to consolidate the streams for processing), and forks (or splits) the media information for the call on a separate path to captions services 145 of captions server 140 (substantially similar to captions services 137 of captions server 130) (e.g., over a network (e.g., Internet, WAN, etc.)) during the call to generate captions of audio of the call or meeting. The captions are provided by a separate channel 165 (substantially similar to channel 155) to a caption device 195 associated with the user of device 160 for presentation to that user.

Figure 3:
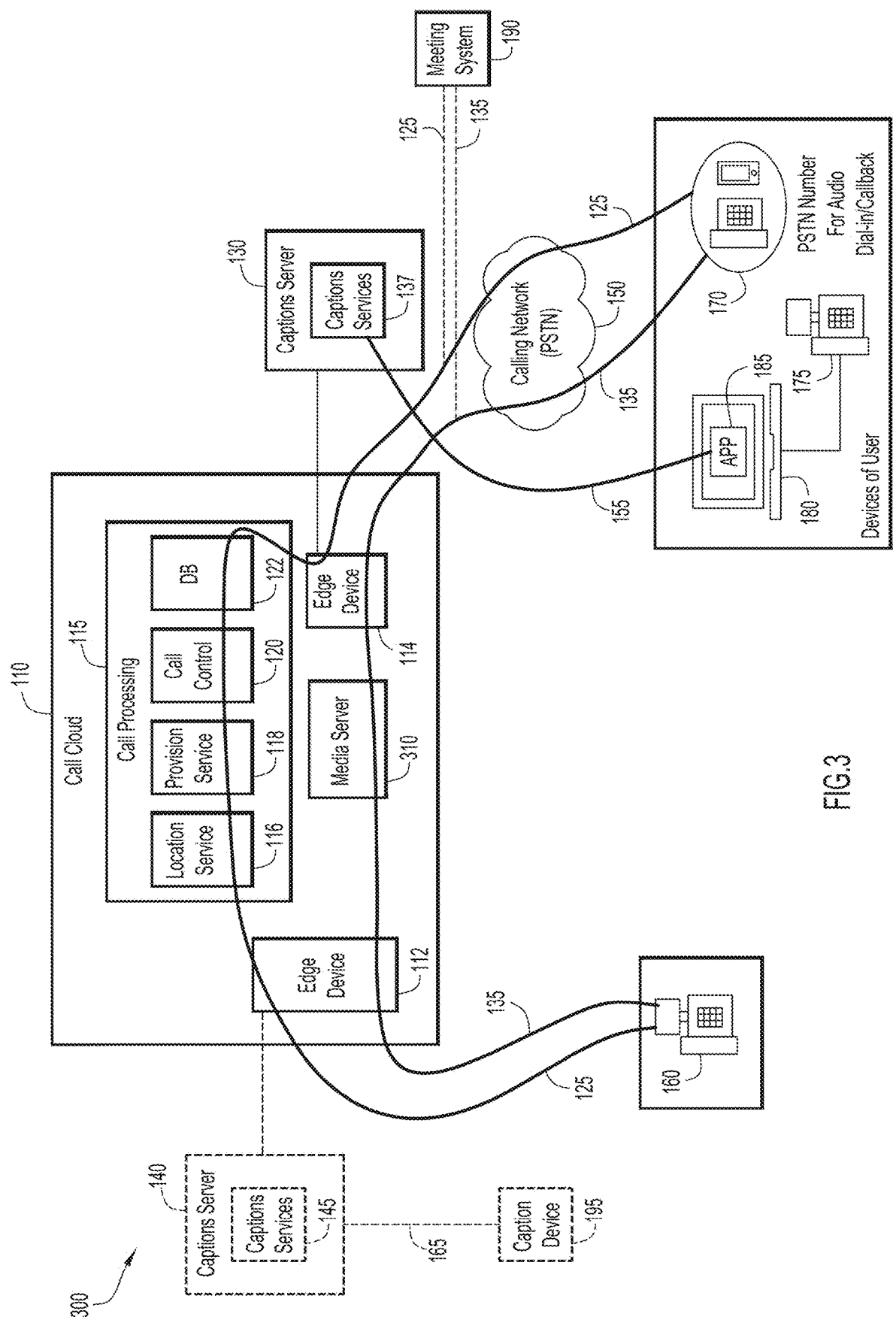
FIG. 3 illustrates a block diagram of yet another system configured for enabling captions for a device without captions capability, according to an example embodiment.

FIG. 3 illustrates a block diagram of yet another example system 300 employing a media server 310 and configured to enable captions for a device without captions capability according to an example embodiment. System 300 is substantially similar to system 100 described above, except that call cloud 110 includes a media server 310 coupled to edge devices 112, 114 to mix media information 135. Media server 310 is substantially similar to media server 210 described above, and may perform various conventional or other functions including mixing, storing, and distributing media over a network. Media server 310 includes a private Internet Protocol (IP) or other network address that cannot be reached from the Internet or other network external of call cloud 110.

Initially, a user of device 160 initiates a call to device 170 as described above for FIG. 1. Signaling information 125 from device 160 is processed by call cloud 110, edge devices 112, 114, and calling network 150 in substantially the same manner described above for FIG. 1 for establishing and conducting the call. Media information 135 is transferred between edge device 112 and device 160 as described above for FIG. 1, and between media server 310 and edge devices 112, 114. Media information 135 is further transferred between edge device 114 and device 170 through calling network 150 as described above for FIG. 1. Media server 310 mixes various media streams (e.g., of call participants, etc.) of the media information for the call to consolidate or reduce the amount of the streams for processing (e.g., produce a single stream of call participants for processing, etc.). The media server further provides the media information for the call to edge device 114 (e.g., enabling transmission from private to public Internet Protocol (IP) or other network addresses). Edge device 114 forks (or splits) the media information for the call on a separate path to captions services 137 of captions server 130 during the call to generate captions of audio of the call. The captions are provided by separate channel 155 to a caption device (e.g., application 185 on computing device 180) for presentation by the caption device to the user of device 170.

Alternatively, device 170 may initiate the call to device 160, or initiate or receive a call from meeting system 190, as described above for FIG. 1. Signaling information 125 for the call is processed by call cloud 110, edge devices 112, 114, and/or calling network 150 in substantially the same manner described above for FIG. 1 for establishing and conducting the call (e.g., between device 170 and device 160, between device 170 and meeting system 190, etc.). Media server 310 mixes media streams of the media information for the call, and provides the media information to edge device 114 that forks (or splits) the media information on a separate path to captions services 137 of captions server 130 (e.g., over a network (e.g., Internet, WAN, etc.)) in order to provide captions to the caption device (e.g., application 185 on computing device 180) in substantially the same manner described above.

In an embodiment, media server 310 may similarly be used to mix media information for captions generation for a user of device 160 in substantially the same manner described above. In this case, media server 310 may receive the media information from edge devices 112, 114 for a call (e.g., between device 160 and device 170, between device 160 and meeting system 190, etc.) as described above. The media server may mix various media streams of the media information for the call (to consolidate the streams for processing), and provides the media information to edge device 112 (e.g., enabling transmission from private to public Internet Protocol (IP) or other network addresses). Edge device 112 forks (or splits) the media information on a separate path to corresponding captions services 145 of captions server 140 (substantially similar to captions services 137 of captions server 130) (e.g., over a network (e.g., Internet, WAN, etc.)) during the call to generate captions of audio of the call or meeting. The captions are provided by a separate channel 165 (substantially similar to channel 155) to a caption device 195 associated with the user of device 160 for presentation by caption device 195 to that user.

Figure 4:
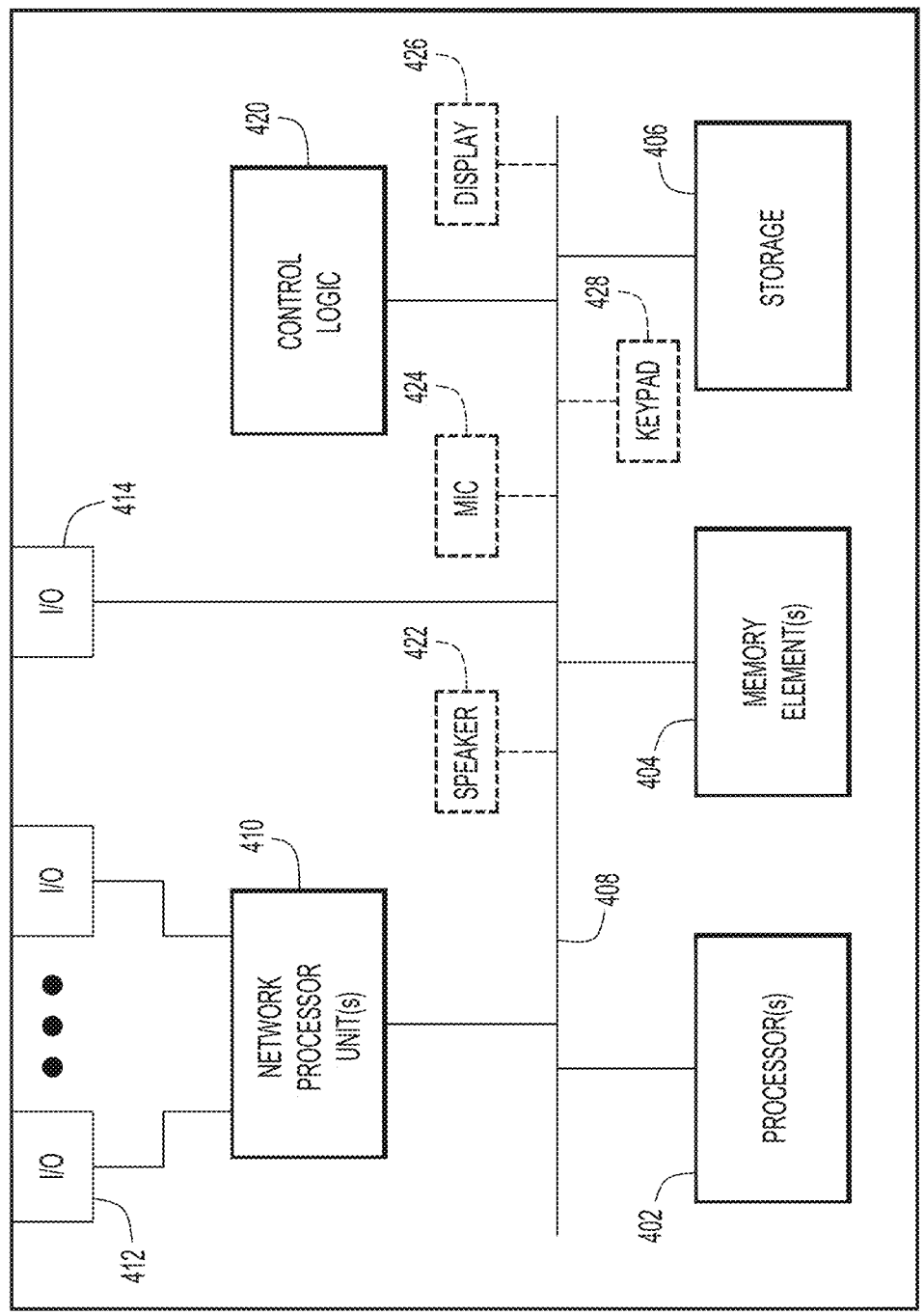
FIG. 4 illustrates a hardware block diagram of a computing device configured to perform functions associated with enabling captions for a device without captions capability as discussed herein, according to an example embodiment.
Figure 5:
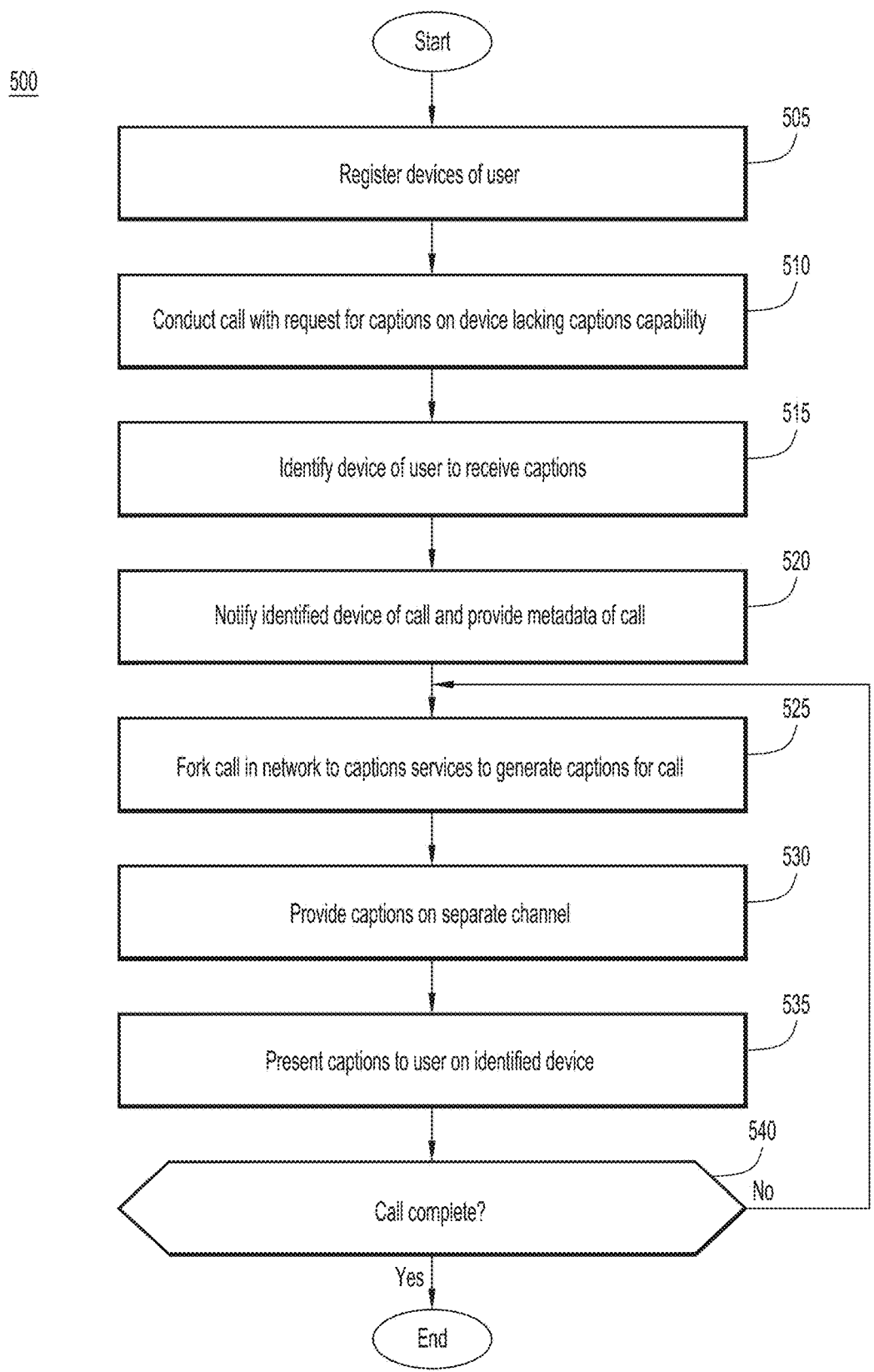
FIG. 5 is a flowchart of a method for enabling captions for a device without captions capability, according to an example embodiment.

Referring to FIG. 4, FIG. 4 illustrates a hardware block diagram of a computing device 400 that may perform functions associated with operations discussed herein in connection with the techniques depicted in FIGS. 1-3 and 5-7. In various embodiments, a computing device or apparatus, such as computing device 400 or any combination of computing devices 400, may be configured as any entity/entities (e.g., calling devices, captions server, media server, edge devices, call cloud servers, computing devices hosting client applications, meeting system servers, etc.) as discussed for the techniques depicted in connection with FIGS. 1-3 and 5-7 in order to perform operations of the various techniques discussed herein.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/antenna array(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., a calling device, a caption device, etc.), computing device 400 may further include a speaker 422 to convey sound, a microphone or other sound receiver 424, a touch screen or other display 426, and/or a keypad or keyboard 428 to enter information (e.g., a Public Switched Telephone Network (PSTN) or other number, alphanumeric information, etc.). These items may be coupled to bus 408 to transfer data with other elements of computing device 400.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

With continued reference to FIGS. 1-3, FIG. 5 illustrates a flowchart of an example method 500 of enabling captions for a device without captions capability according to an example embodiment. Initially, devices of a user are registered with call control 120 at operation 505. The devices are associated with a corresponding user based on a user identifier. The user identifier may be any network or other identifier (e.g., Public Switched Telephone Network (PSTN) number, a participant identity for a meeting, network identifier, any identifier uniquely indicating a user, etc.). The devices may be any devices able to initiate or receive a call and/or provide captions (e.g., an application on a same or different device used for a call, a mobile phone, an application for controlling a desk phone (and/or conducting a call through a desk phone), and/or other devices that are able to provide captions).

In an embodiment, the registration of devices may be accomplished via a user interface of call control 120 (e.g., presented by a user device), where the user may specify one or more user devices and a user identifier associated with the user (e.g., Public Switched Telephone Network (PSTN) number, a participant identity for a meeting, network identifier, etc.). Registration information is stored in database 122. The registration information includes entries indicating associations of the devices to the user identifier, thereby associating the devices with the user. In addition, the user may provide attributes and/or additional information pertaining to a device (e.g., captions capability; user preference, priority, and/or ranking for using the device; etc.). Call control 120 may analyze the registration information to identify entries associated with the user based on the user identifier corresponding to (or matching) the user identifier of the entries. The identified entries indicate the devices (and the attributes and/or additional information for the devices) associated with the user.

In an embodiment, the registration may be accomplished based on use of a device or signing in to a device by the user. For example, a user may sign in to a device in the form of an application on a computing device, where the application communicates with call control 120. By way of further example, a user may employ a desk phone, where the desk phone communicates with call control 120. The call control may receive or ascertain a user identifier associated with the user of the device (e.g., Public Switched Telephone Network (PSTN) number, a participant identity for a meeting, network identifier, etc.). In addition, the call control may receive or ascertain attributes and/or additional information pertaining to the device (e.g., captions capability; user preference, priority, and/or ranking for using the device; etc.). Registration information is stored in database 122. The registration information includes entries indicating association of the device to the user identifier, thereby associating the device with the user. Call control 120 may analyze the registration information to identify entries associated with the user based on the user identifier corresponding to (or matching) the user identifier of the entries. The identified entries indicate the devices (and the attributes and/or additional information for the devices) associated with the user.

In an embodiment, a calling device (e.g., mobile device, etc.) that also supports an application capable of providing captions may use a Public Switched Telephone (PSTN) or other network identity or identifier (e.g., calling number, etc.) of a user in order to be associated with the user. When the application registers with call control 120, the application is associated with the network identifier (e.g., mobile number, etc.) of the device hosting the application. User consent may be obtained in order to generate this association.

In an embodiment, call control 120 may provide various features in order to reach a user through different devices. For example, a Public Switched Telephone (PSTN) or other network identifier (e.g., PSTN number, etc.) of the user may be associated with several devices of the user (e.g., including an application providing captions) on call control 120 to reach the user through the associated devices. By way of example, a call to the PSTN number enables each of the associated devices to receive the call in order to reach the user. In this case, there is no need for call control 120 to associate the application with that network identifier for providing captions since the call control already has that knowledge. In an embodiment, an enterprise may provide a business number (e.g., PSTN number, etc.) to an enterprise user for making/receiving calls on that number. With respect to this feature, the business number is automatically associated with the devices of the enterprise user (including the application providing captions) on call control 120. In this case as well, there is no need for call control 120 to associate the application with that business number for providing captions since the call control already has that knowledge. In these embodiments, captions are provided on an associated caption device regardless of which device associated with the user is used for the call.

A call is conducted between users at operation 510. For example, the call may include a Public Switched Telephone (PSTN) or other network call between parties (e.g., a call between two parties, a conference call between three or more parties, etc.), or a PSTN or other network call to participate in a meeting (e.g., by direct dial-in or call back to a PSTN device). A device used for the call may lack captions capability, and include a PSTN device, desk phone (controlled by an application on a computing device to conduct calls via desk phone control (DPC) or other modes), or other device which does not support captions. However, the user of the device requests captions for the call through the device (e.g., from a desk phone menu, an application, etc.). The call may be processed and routed through call cloud 110 in substantially the same manner described above. A PSTN call may be any call directed to a PSTN identifier (e.g., a PSTN number, etc.) and/or utilizing a PSTN to establish or conduct the call.

Call control 120 identifies a caption device of the user to receive captions for the call at operation 515. The caption devices associated with the user may be ascertained based on a user identifier (e.g., obtained from call information, etc.) and the registration information. For example, call control 120 may analyze the registration information in database 122 to identify entries associated with the user based on the user identifier corresponding to (or matching) the user identifier of the entries. The identified entries indicate the devices (and the attributes and/or additional information for the devices) associated with the user. Call control 120 determines caption devices of the user based on attributes of the devices of the identified entries indicating the presence of captions capability. Call control 120 may select a determined caption device of the user to receive captions for the call based on various attributes and/or criteria.

In an embodiment, call control 120 may identify a caption device to receive captions for the call based on user preferences, priority, and/or ranking of the determined caption devices within corresponding entries of the registration information (e.g., a caption device with greatest preference, priority, and/or ranking may be selected, etc.). In an embodiment, the user may indicate or specify a caption device to receive captions for the call in the request for captions.

In an embodiment, call control 120 may ascertain display characteristics or capabilities (e.g., network connectivity, display resolution and/or size, etc.) of the devices associated with the user (including the device used for conducting the call). This information may be stored in the registration information. The call control may identify a caption device that renders captions with a greatest quality (e.g., based on network connectivity to a captions server, display resolution and/or size, etc.). For example, a caption device with a fast and/or consistent network connection (e.g., greatest speed/bandwidth, least information loss, etc.) may be selected to render captions without delay or interruption. Further, a caption device with a greatest display resolution and/or size may be selected to render captions with greater visibility.

In an embodiment, call control 120 may ascertain status information of the devices associated with the user (including the device used for conducting the call). The status information may include any information to determine or indicate use of the device by a user. The status information may be stored in the registration information. The call control may identify a caption device to receive captions for the call based on the status (use or non-use of the caption device by a user). For example, a device may already be used by a user, where the user may prefer not to use that device for captions. By way of further example, a laptop may be used to share some content during a call. The user may not desire captions to be sent to the soft phone user interface on the laptop, but rather prefers captions to go to another device of the user.

In an embodiment, call control 120 may ascertain location information of the devices associated with the user (including the device used for conducting the call). The location information may include any information to determine or indicate a location of a device (e.g., Global Positioning System (GPS) information provided by the devices, Internet Protocol (IP) or other network addresses of the devices, etc.). The location information may be stored in the registration information. Call control 120 determines locations of the determined caption devices and the device used by the user for the call based on the location information. The call control determines distances of the determined caption devices (e.g., geographical, spatial, etc.) from the user (or device used for the call) based on the determined locations and/or location information. The call control may identify a caption device to receive captions for the call that is within a certain distance or range from the user (or device used for the call) based on the determined distances. The certain distance or range may be specified in any manner (e.g., specified by a user, pre-configured or pre-determined, determined by call control 120 based on various factors or conditions (e.g., amount of devices in an area, etc.), etc.).

In an embodiment, call control 120 may identify a caption device to receive captions for the call that is closest (e.g., least geographical or spatial distance, etc.) to the user (or device used for the call). In the event more than one caption device is within the certain range or is closest to the user, the user preferences, priority, and/or ranking of the registration information, device status, and/or device display characteristics may be used to identify the caption device to receive captions for the call (e.g., a caption device with greatest preference, priority, and/or ranking may be selected, non-use by user, greatest display quality, etc.).

In an embodiment, call control 120 may monitor locations of the devices associated with the user (e.g., periodically, according to a schedule, continuously, etc.). When the user (or device used for the call) or caption device used for the call changes locations, call control 120 may identify another caption device to receive the call and direct that captions be provided (or switched) to the identified other caption device for the call. In other words, call control 120 may switch caption devices during the call as the user (or device used for the call) or caption device used for the call changes locations. The call control may identify a caption device due to location changes in substantially the same manner described above (e.g., a caption device with greatest preference, priority, and/or ranking may be selected, a caption device within a certain distance or range from the user (or device used for the call), a caption device closest (e.g., least geographical or spatial distance, etc.) to the user (or device used for the call), a status of a caption device pertaining to use or non-use by a user, display quality, etc.).

In addition, a caption device may be identified based on any criteria, or combination of criteria, discussed above (e.g., a caption device with greatest preference, priority, and/or ranking may be selected, a caption device within a certain distance or range from the user (or device used for the call), a caption device closest (e.g., least geographical or spatial distance, etc.) to the user (or device used for the call), a status of a caption device pertaining to use or non-use by a user, display quality, etc.).

In an embodiment pertaining to a meeting, a participant identity may be associated with and used to find related devices of the meeting participant. When the participant has a meeting application installed on a PSTN device and uses a PSTN call back/dial-in number, the associated meeting application is used as a caption device for the call.

Call control 120 provides notification and metadata (e.g., network identifier, party, etc.) of the call to the identified caption device at operation 520. The notification may request the identified caption device to join the call flow in order to receive captions. The identified caption device is preferably requested to join the call flow for the captions without receiving media or content of the call (e.g., audio, video, etc.). Once the identified caption device has responded to the request to join the call flow, call control 120 may engage an edge device (FIGS. 1 and 3) or a media server (FIG. 2) of call cloud 110 to fork media (e.g., audio transmitted/received) to captions services of a captions server as described above to generate the transcript/captions of the call at operation 525.

The captions are provided or pushed to the identified caption device at operation 530 on a channel separate from channels used for the call (e.g., a web socket or http connection from the captions server to the identified caption device, etc.). The separate channel is preferably a low latency channel. The captions are rendered on the identified caption device and presented to the user at operation 535. The captions and media information may include timestamps or other indicators to present the captions in synchronization with audio of the call.

Additional operations may be performed for the captions (e.g., by the identified caption device and/or the captions services of the captions server). For example, translation of the captions (or call) from one natural or spoken language to another may be performed. This may be accomplished via any conventional or other techniques (e.g., manual translation, automated translation (e.g., conventional or other translation software, etc.), etc.). In one embodiment, a user may specify a desired natural or spoken language for the captions (e.g., in the request for captions, etc.), where the specified language may be different from the language of the call. In one embodiment, the desired natural or spoken language may be obtained automatically from the device of the call (e.g., language indicated in settings options for the device, etc.). The captions are translated to the desired spoken or natural language (e.g., by the identified caption device and/or the captions services) and presented to the user on the identified caption device.

Further, the captions may be highlighted to indicate certain portions (e.g., by the identified caption device and/or the captions services of the captions server). The portions may be identified based on natural language processing (NLP) of the captions to identify sentiment, emotion, specific words, or other aspects of the captions (or call). For example, specific words may be of high interest to the user or highly relevant to a topic of interest of the user, and may be highlighted. Further, certain portions indicating high sentiment or emotion may indicate important sections for the user, and be highlighted (e.g., the NLP may determine a score for emotion, sentiment and other attributes and highlight portions exceeding a score threshold, etc.). The highlighting may include any techniques of visually distinguishing the portions (e.g., highlighting, underlining, bold, different font, different size, different color, etc.).

In addition, the captions may be analyzed to identify and perform various voice commands (e.g., by the identified caption device and/or the captions services of the captions server). The voice commands may be from a list of commands, or may be indicated by a cue in the captions. The captions may be analyzed to identify voice commands (e.g., from the list and/or based on the cues, etc.) and perform corresponding actions. The voice commands may pertain to any desired actions of the identified caption device (e.g., document retrieval, application initiation/termination/suspension, calendar entries, contact entries, caption initiation/termination/suspension, etc.). For example, a voice command within the captions may indicate to retrieve a document (e.g., web page, etc.), and the document may be retrieved (e.g., by the identified caption device) and presented on the identified caption device.

The above process repeats from operation 525 until termination of the call as determined at operation 540. In case two or more parties of a call desire captions (when using devices for the call lacking captions capability), method 500 may be performed in substantially the same manner described above for each user desiring captions.

Figure 6:
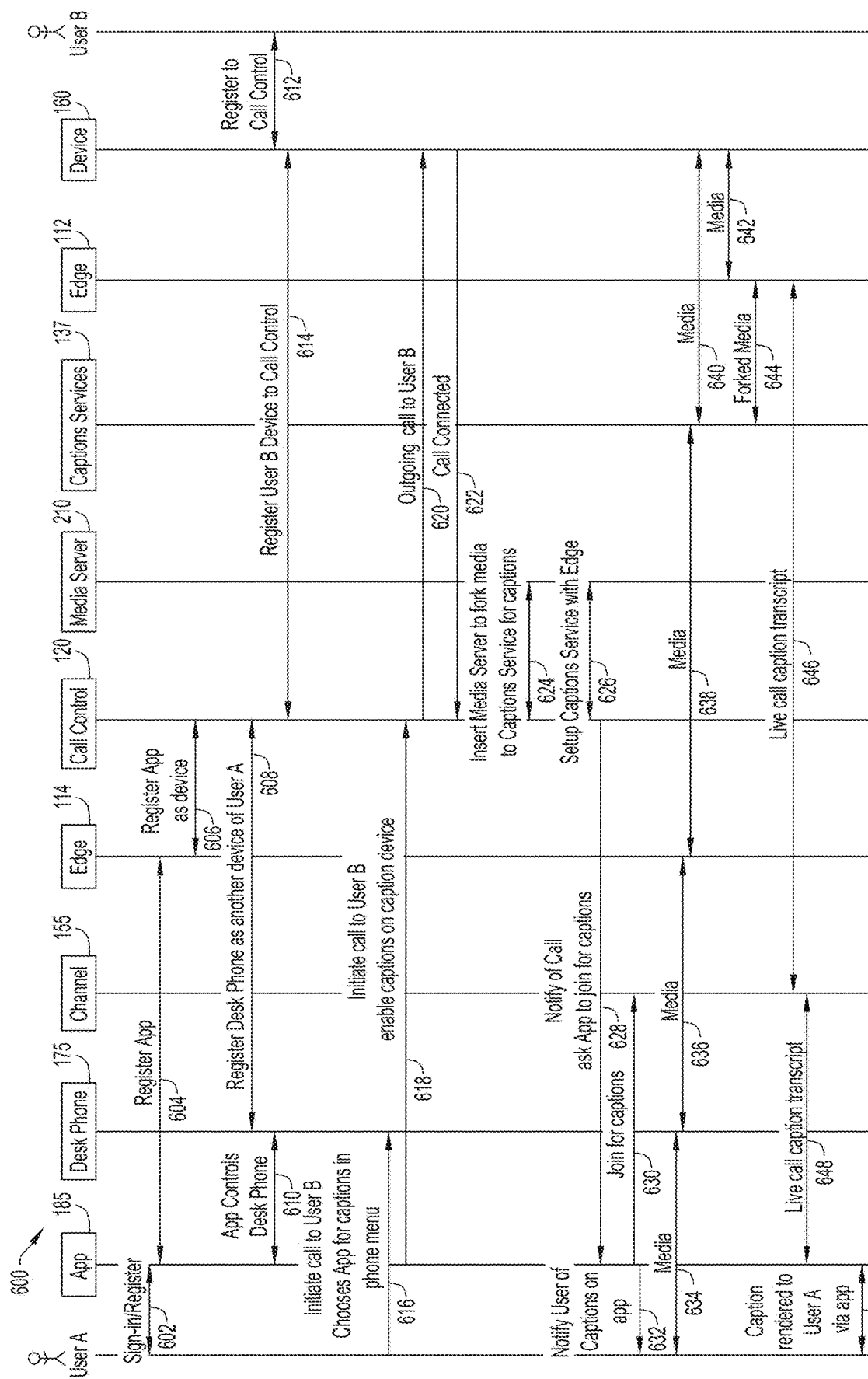
FIG. 6 illustrates a flow diagram for enabling captions for a desk phone without captions capability, according to an example embodiment.

With continued reference to FIGS. 1-3, FIG. 6 illustrates a method 600 for enabling captions for a desk phone lacking captions capability according to an example embodiment. While the operations of FIG. 6 are described with respect to a desk phone and rendering captions on an associated application controlling desk phone operation, it will be appreciated that any device lacking captions capability may be used for conducting the call and any associated device with captions capability may be used to render captions in substantially the same manner described below.

Initially, user A may be associated with multiple devices. For example, the devices may include desk phone 175 and an application 185 of a computing device 180 (e.g., a soft client performing calling operations and/or controlling operation of desk phone 175), and may be coupled to edge device 114 for call processing (e.g., via Voice over Internet Protocol (VoIP), Public Switched Telephone Network (PSTN), etc.). User B may be associated with a device 160 (e.g., desk phone, etc.) that may be coupled to edge device 112 for call processing (e.g., via Voice over Internet Protocol (VoIP), PSTN, etc.). User A desires to receive captions for a call to user B initiated from desk phone 175 lacking captions capability. User A signs in to application 185 on computing device 180 at operation 602. The computing device may be any suitable device for hosting application 185 (e.g., computer system, smartphone, tablet, etc.). The application registers with call control 120 of user A as a caption device through edge device 114 at operations 604, 606. Desk phone 175 also registers with call control 120 as a device of user A at operation 608. Call control 120 produces and stores registration information associating desk phone 175 and application 185 with user A in database 122 based on a user identifier for user A (e.g., Public Switched Telephone Network (PSTN) number or network identifier, participant identifier, etc.). Application 185 is configured to control desk phone 175 at operation 610 (e.g., to conduct calls through the desk phone, etc.).

Device 160 (e.g., desk phone, etc.) of user B for receiving a call from user A registers with call control 120 as a device of user B at operations 612, 614. Call control 120 similarly produces and stores registration information associating device 160 with user B in database 122 based on a user identifier for user B (e.g., Public Switched Telephone Network (PSTN) number or network identifier, participant identifier, etc.).

User A initiates a call to user B at operation 616, where user A selects application 185 as a caption device on a desk phone menu. Application 185 initiates the call to user B through desk phone 175, services requests, and enables captions at operation 618. The call is routed by call control 120 to device 160 of user B at operation 620. User B is notified of, and answers, the call on device 160, and the call is connected between user A and user B at operation 622 (e.g., in substantially the same manner described above for FIGS. 1-3). Call control 120 inserts media server 210 into the call flow at operation 624 to enable or provide forking of media of the call to captions services 137 in order for the captions services to convert audio of the call to text and generate captions during the call. Call control 120 configures the captions services 137 to receive the media through edge device 114 of user A and media server 210 at operation 626.

Once the captions services are configured, call control 120 notifies application 185 of the call, and requests the application to join the call flow for captions at operation 628. The application is preferably requested to join the call flow for the captions without receiving media or content of the call (e.g., audio, video, etc.). The application responds to the request, and call control 120 joins application 185 to the call flow with respect to captions at operation 630. In an embodiment, call control 120 notifies other devices of user A capable of receiving captions not to provide or display captions for the call. The captions are provided on channel 155 separate from channels used for the call. Application 185 notifies user A that captions are to be rendered by the application at operation 632.

The call proceeds with media of user A and user B being transferred between desk phone 175 of user A and device 160 of user B through edge device 114, media server 210, and edge device 112 at operations 634, 636, 638, 640, and 642 (e.g., in substantially the same manner described above for FIGS. 1-3). The media is forked by media server 210 to captions services 137 at operation 644 to generate a live transcript of audio of the call and produce captions (e.g., in substantially the same manner described above for FIG. 2). The captions are provided over separate channel 155 to application 185 at operations 646, 648. The captions are rendered by the application and presented to user A at operation 650.

Figure 7:
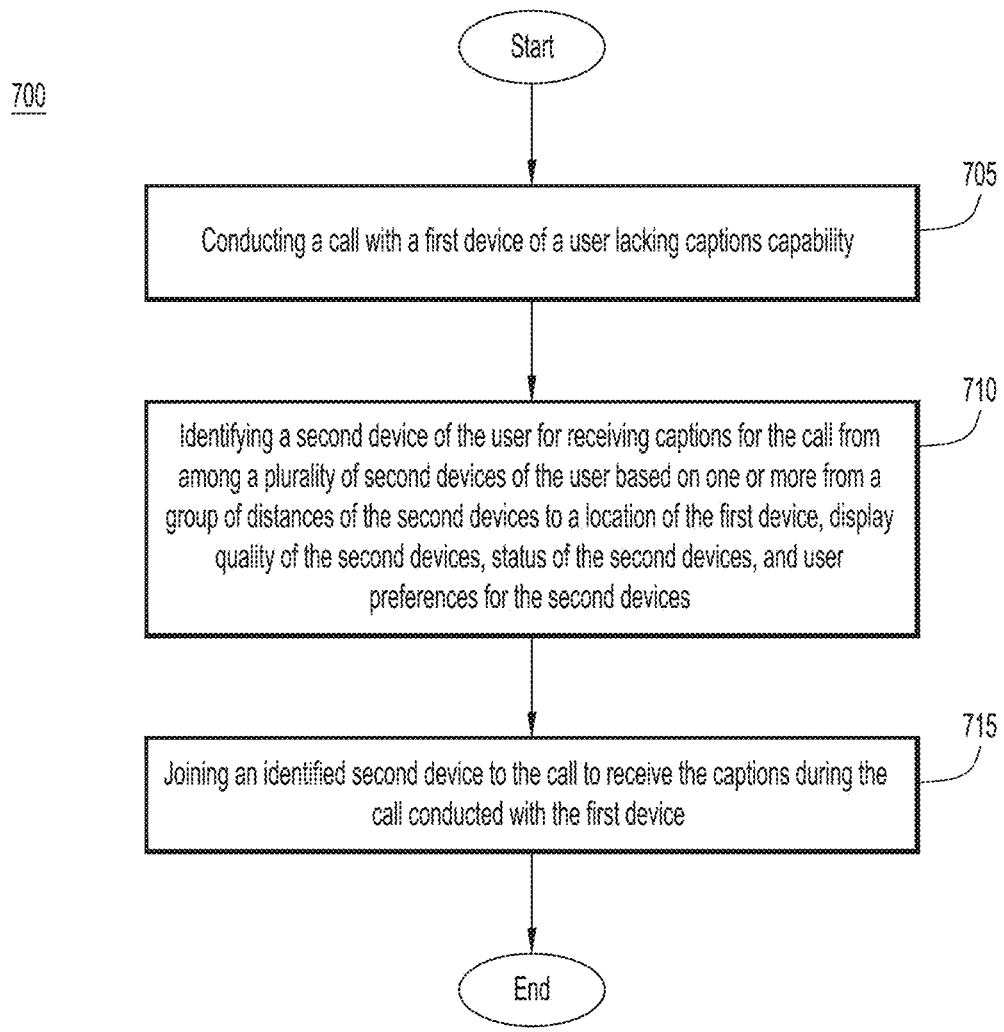
FIG. 7 illustrates a flowchart of a generalized method for enabling captions for a device without captions capability, according to an example embodiment.

FIG. 7 is a flowchart of an example method 700 for enabling captions for a device without captions capability according to an example embodiment. At operation 705, a call is conducted with a first device of a user, the first device lacking captions capability. At operation 710, a second device of the user is identified for receiving captions for the call from among a plurality of second devices of the user based on one or more from a group of distances of the second devices to a location of the first device, display quality of the second devices, status of the second devices, and user preferences for the second devices. At operation 715, an identified second device is joined to the call to receive the captions during the call conducted with the first device.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation. In an embodiment, the caption device may provide captions for another device used for a call that may have captions capability in substantially the same manner described above.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may be directly or indirectly be connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: conducting a call with a first device of a user, the first device lacking captions capability; identifying a second device of the user for receiving captions for the call from among a plurality of second devices of the user based on one or more from a group of distances of the second devices to a location of the first device, display quality of the second devices, status of the second devices, and user preferences for the second devices; and joining an identified second device to the call to receive the captions during the call conducted with the first device.

In one example, the identified second device has one or more from a group of: a location closest to the location of the first device, a greatest display quality, a status indicating unused by the user (that is, not currently in use by the user), and a greatest user preference.

In one example, the identified second device controls the first device to conduct the call.

In one example, the identified second device includes a Public Switched Telephone Network (PSTN) number different from the Public Switched Telephone Network (PSTN) number of the first device.

[moo] In one example, the call is a Public Switched Telephone Network (PSTN) call and enables participation in a meeting.

In one example, the captions include one or more from a group of: a translation to a different natural language, a highlighted portion, and a voice command.

In one example, the method further comprises enabling forking of content of the call within a cloud environment during processing of the call to generate the captions.

In another form, an apparatus is provided. The apparatus comprises: a call controller comprising one or more processors, wherein the one or more processors are configured to: conduct a call with a first device of a user, the first device lacking captions capability; identify a second device of the user for receiving captions for the call from among a plurality of second devices of the user based on one or more from a group of distances of the second devices to a location of the first device, display quality of the second devices, status of the second devices, and user preferences for the second devices; and join an identified second device to the call to receive the captions during the call conducted with the first device.

In another form, one or more non-transitory computer readable storage media are provided. The non-transitory computer readable storage media are encoded with processing instructions that, when executed by one or more processors, cause the one or more processors to: conduct a call with a first device of a user, the first device lacking captions capability; identify a second device of the user for receiving captions for the call from among a plurality of second devices of the user based on one or more from a group of distances of the second devices to a location of the first device, display quality of the second devices, status of the second devices, and user preferences for the second devices; and join an identified second device to the call to receive the captions during the call conducted with the first device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
conducting a call with a first device of a user via a network environment providing call processing services to establish and conduct the call, the first device lacking capability to support captions for the call;
identifying a second device of the user for receiving the captions for the call, wherein the second device is identified from among a plurality of second devices of the user based on one or more from a group of distances of the second devices to a location of the first device, display quality of the second devices, status of the second devices, and user preferences for the second devices;
joining an identified second device to the call via the call processing services to receive the captions during the call conducted with the first device; and
enabling forking of content of the call within the network environment providing the call processing services during processing of the call to provide content of the call on a separate path to a captions system to generate the captions.

2. The method of claim 1, wherein the identified second device has one or more from a group of a location closest to the location of the first device, a greatest display quality, a status indicating unused by the user, and a greatest user preference.

3. The method of claim 1, wherein the identified second device controls the first device to conduct the call.

4. The method of claim 1, wherein the identified second device includes a Public Switched Telephone Network (PSTN) number different from the Public Switched Telephone Network (PSTN) number of the first device.

5. The method of claim 1, wherein the call is a Public Switched Telephone Network (PSTN) call and enables participation in a meeting.

6. The method of claim 1, wherein the captions include one or more from a group of: a translation to a different natural language, a highlighted portion, and a voice command.

7. The method of claim 1, wherein the network environment includes a cloud environment.

8. An apparatus comprising:
a call controller comprising one or more processors, wherein the one or more processors are configured to:
conduct a call with a first device of a user via a network environment providing call processing services to establish and conduct the call, the first device lacking capability to support captions for the call;
identify a second device of the user for receiving the captions for the call, wherein the second device is identified from among a plurality of second devices of the user based on one or more from a group of distances of the second devices to a location of the first device, display quality of the second devices, status of the second devices, and user preferences for the second devices;
join an identified second device to the call via the call processing services to receive the captions during the call conducted with the first device; and
enable forking of content of the call within the network environment providing the call processing services during processing of the call to provide content of the call on a separate path to a captions system to generate the captions.

9. The apparatus of claim 8, wherein the identified second device has one or more from a group of a location closest to the location of the first device, a greatest display quality, a status indicating unused by the user, and a greatest user preference.

10. The apparatus of claim 8, wherein the identified second device controls the first device to conduct the call.

11. The apparatus of claim 8, wherein the identified second device includes a Public Switched Telephone Network (PSTN) number different from the Public Switched Telephone Network (PSTN) number of the first device.

12. The apparatus of claim 8, wherein the call is a Public Switched Telephone Network (PSTN) call and enables participation in a meeting.

13. The apparatus of claim 8, wherein the captions include one or more from a group of: a translation to a different natural language, a highlighted portion, and a voice command.

14. The apparatus of claim 8, wherein the network environment includes a cloud environment.

15. One or more non-transitory computer readable storage media encoded with processing instructions that, when executed by one or more processors, cause the one or more processors to:
conduct a call with a first device of a user via a network environment providing call processing services to establish and conduct the call, the first device lacking capability to support captions for the call;
identify a second device of the user for receiving the captions for the call, wherein the second device is identified from among a plurality of second devices of the user based on one or more from a group of distances of the second devices to a location of the first device, display quality of the second devices, status of the second devices, and user preferences for the second devices;
join an identified second device to the call via the call processing services to receive the captions during the call conducted with the first device; and
enable forking of content of the call within the network environment providing the call processing services during processing of the call to provide content of the call on a separate path to a captions system to generate the captions.

16. The one or more non-transitory computer readable storage media of claim 15, wherein the identified second device has one or more from a group of a location closest to the location of the first device, a greatest display quality, a status indicating unused by the user, and a greatest user preference.

17. The one or more non-transitory computer readable storage media of claim 15, wherein the identified second device includes a Public Switched Telephone Network (PSTN) number different than the Public Switched Telephone Network (PSTN) number of the first device and the captions include one or more from a group of: a translation to a different natural language, a highlighted portion, and a voice command.

18. The one or more non-transitory computer readable storage media of claim 15, wherein the call is a Public Switched Telephone Network (PSTN) call and enables participation in a meeting.

19. The one or more non-transitory computer readable storage media of claim 15, wherein the identified second device controls the first device to conduct the call.

20. The one or more non-transitory computer readable storage media of claim 15, wherein the network environment includes a cloud environment.

* * * * *